Aug. 19, 1952    G. W. BREUER ET AL    2,607,603
COUPLING FOR BRUSH BACKS
Filed April 22, 1949
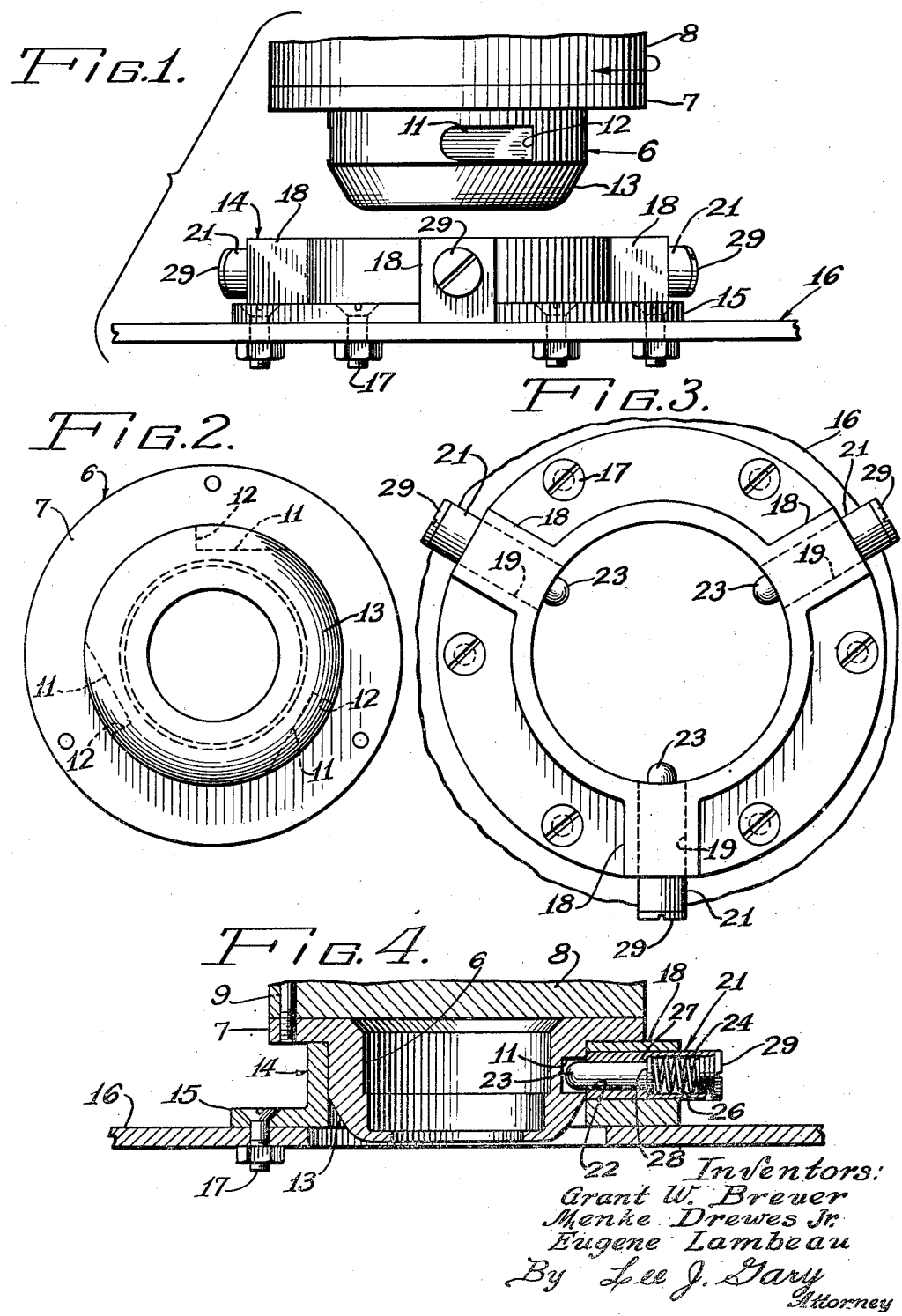
Inventors:
Grant W. Breuer
Menke Drewes Jr.
Eugene Lambeau
By Lee J. Gary
Attorney Patented Aug. 19, 1952

2,607,603

UNITED STATES PATENT OFFICE 2,607,603

COUPLING FOR BRUSH BACKS

Grant W. Breuer, Wilmette, and Menke Drewes, Jr., and Eugene Lambeau, Chicago, Ill., assignors to Breuer Electric Manufacturing Company, Chicago, Ill., a corporation of Illinois Application April 22, 1949, Serial No. 89,113

6 Claims. (Cl. 279—66)

This invention relates to couplings and is more particularly concerned with the provision of a coupling adapted for use in detachably connecting brush backs to the operating shaft of a disc-type floor treating machine.

In the operation of this type of floor treating machine, it is desirable to provide coupling means adapted to facilitate the removal or replacement of brush backs. The present invention contemplates the provision of a coupling comprising a plug member mounted on the operating shaft of the floor treating machine to receive and engage a socket member secured to the brush back. The outer surface of the plug member is formed with a plurality of equally spaced recesses to receive a plurality of radially disposed spring pressed plungers mounted upon the socket member.

This invention further contemplates the provision of a coupling comprising a plug and socket member in which the socket member is disengaged from the plug member by merely rotating same in a reverse direction to the normal direction of rotation of the operating shaft.

This invention further contemplates the provision of a coupling in which the socket member is automatically locked onto the plug member by merely inserting the plug member in the socket and then starting the motor employed to rotate the operating shaft.

This invention further contemplates the provision of a coupling for brush backs which is relatively simple and inexpensive to manufacture and which will not readily get out of order.

This invention embodies other novel features, details of construction and arrangement of parts which are hereinafter set forth in the specification and claims, and illustrated in the accompanying drawing, wherein:

Fig. 1 is a side elevational view illustrating a coupling embodying features of the present invention, the socket member being disconnected from the plug member.

Fig. 2 is a bottom plan view showing the plug member.

Fig. 3 is a top plan view showing the socket member.

Fig. 4 is a transverse sectional view showing the socket member mounted in operating position upon the plug member.

Referring now to the drawing for a better understanding of this invention, the coupling is shown as comprising a plug member 6 formed with a flange 7 adapted to be secured to the operating shaft 8 of a floor treating machine by means of cap screws 9. The outer surface of the plug member 6 is preferably formed with three equally spaced recesses 11, each of which terminates at an abutment shoulder 12. The plug member is also formed with a tapered outer end 13.

A socket member 14 is provided with a flange 15 adapted to be secured to a brush back 16 by means of bolts 17. The socket member 14 is in the form of a collar adapted to snugly receive and engage the plug member 6, as illustrated in Fig. 4. The socket member is preferably in the form of a casting provided with three equally spaced, radially disposed bosses 18 which are bored radially at 19 to receive plunger housings 21. The outer surface of the plunger housings 21 are preferably knurled and force fitted into their respective bores 19 provided in the bosses 18.

Each plunger housing 21 is bored at one end at 22 to slidably receive a plunger 23, the other end of the housing being bored at 24 to form an enlarged diameter chamber to receive a compression spring 26. The inner end of the bore 24 terminates at a shoulder 27 adapted to normally engage a head portion 28 formed on the inner end of the plunger 23. A screw 29 is threaded into the end of the housing 21. The housings 21 and the parts mounted therein are preferably formed of stainless steel or other non-corrosive metal to insure a satisfactory service life.

In mounting the brush back 16 on the operating shaft 8 of a floor treating machine by means of the coupling members heretofore described in connection with the drawing, the brush back is placed upon a floor with the socket member 14 extending upwardly. The floor treating machine is then moved into position above the brush back 16, with the plug member 6 disposed in vertical alignment above the socket member 14. The end of the floor treating machine, carrying the plug member 6, is then lowered causing the plug member 6 to move into the socket 14. By providing a tapered outer end 13 on the plug member 6 and by rounding the inner ends of the plungers 23, it will be noted that the plug member 6 acts to move the plungers 23 rearwardly against the action of their compression springs 26 until the plug member 6 is mounted within the socket member 14. By causing rotational movement of the operating shaft 8 in the direction indicated by the arrow in Fig. 1, it will be noted that the ends of the plungers 23 will become automatically seated in their respective recesses 11 and against their respective abutment shoulders 12.

In removing the brush back 16 from the operating shaft 8 of the floor treating machine, the brush end of the floor treating machine is tilted upwardly to raise the brush back from the floor. The brush back 16 is then manually rotated in the direction of rotation of the operating shaft 8 to cause the plungers 23 to move out of their respective recesses 11. The brush back 16 is then free to fall downwardly from its position on the plug member 6.

While this invention has been shown in but one form, it is obvious to those skilled in the art that it is not so limited but is susceptible of various changes and modifications without departing from the spirit and scope of the claimed invention.

We claim as our invention:

1. In a coupling for detachably connecting a brush back to the operating shaft of a floor treating machine, a cylindrical plug member having its outer surface formed with a plurality of transversely disposed relatively elongated recesses, the defining walls of each of said recesses sloping inwardly from the outer surface of said plug member and terminating at an abutment wall disposed at substantially right angles to the recess walls, a tubular socket member formed to snugly receive said plug member, a plurality of radially disposed plungers mounted on said socket member for radial movement into and out of the recesses formed in said plug member, and resilient means to yieldably resist radial movement of said plungers from said recesses, the outer end of said plug member having an outwardly converging frustro-conical surface to engage the inner ends of said plungers and to move the latter radially outwardly during insertion of the plug member into said socket member.

2. In a coupling for detachably connecting a brush back to the operating shaft of a floor treating machine, a cylindrical plug member having its outer surface formed with a plurality of transversely disposed relatively elongated recesses, the defining walls of each of said recesses sloping inwardly from the outer surface of said plug member and terminating at an abutment wall disposed at substantially right angles to the recess walls, a tubular socket member formed to snugly receive said plug member, a plurality of radially disposed plungers mounted on said socket member for radial movement into and out of the recesses formed in said plug member, and resilient means to yieldably resist radial movement of said plungers from said recesses, the outer end of said plug member having an outwardly converging frustro-conical surface to engage the inner ends of said plungers and to move the latter radially outwardly during insertion of the plug member into said socket member, each of said plungers being slidably mounted within a radially disposed housing secured to said socket member.

3. In a coupling for detachably connecting a brush back to the operating shaft of a floor treating machine, a cylindrical plug member having its outer surface formed with a plurality of transversely disposed relatively elongated recesses, the defining walls of each of said recesses sloping inwardly from the outer surface of said plug member and terminating at an abutment wall disposed at substantially right angles to the recess walls, a tubular socket member formed to snugly receive said plug member, a plurality of radially disposed plungers mounted on said socket member for radial movement into and out of the recesses formed in said plug member, and resilient means to yieldably resist radial movement of said plungers from said recesses, the outer end of said plug member having an outwardly converging frustro-conical surface to engage the inner ends of said plungers and to move the latter radially outwardly during insertion of the plug member into said socket member, each of said plungers being slidably mounted within a housing secured to said socket member, the outer end of each housing being formed with a spring chamber, and a compression spring mounted within each spring chamber to yieldably resist outward radial movement of its respective plunger.

4. In a coupling for detachably connecting a brush back to the operating shaft of a floor treating machine, a cylindrical plug member having its outer surface formed with a plurality of transversely disposed relatively elongated recesses, the defining walls of each of said recesses sloping inwardly from the outer surface of said plug member and terminating at an abutment wall disposed at substantially right angles to the recess walls, a tubular socket member formed to snugly receive said plug member, a plurality of radially disposed plungers mounted on said socket member for radial movement into and out of the recesses formed in said plug member, and resilient means to yieldably resist radial movement of said plungers from said recesses, the outer end of said plug member having an outwardly converging frustro-conical surface to engage the inner ends of said plungers and to move the latter radially outwardly during insertion of the plug member into said socket member, said socket member being formed with a flange adapted to be connected to a brush back.

5. In a coupling for detachably connecting a brush back to the operating shaft of a floor treating machine, a cylindrical plug member having its outer surface formed with a plurality of transversely disposed relatively elongated recesses, the defining walls of each of said recesses sloping inwardly from the outer surface of said plug member and terminating at an abutment wall disposed at substantially right angles to the recess walls, a tubular socket member formed to snugly receive said plug member, a plurality of radially disposed plungers mounted on said socket member for radial movement into and out of the recesses formed in said plug member, and resilient means to yieldably resist radial movement of said plungers from said recesses, the outer end of said plug member having an outwardly converging frustro-conical surface to engage the inner ends of said plungers and to move the latter radially outwardly during insertion of the plug member into said socket member, said socket member being formed with a flange adapted to be connected to a brush back, said plug member being formed with a flange adapted to be connected to the operating shaft of a floor treating machine.

6. In a coupling for detachably connecting a brush back to the operating shaft of a floor treating machine, a cylindrical plug member having its outer surface formed with a plurality of transversely disposed relatively elongated recesses, the defining walls of each of said recesses sloping inwardly from the outer surface of said plug member and terminating at an abutment wall disposed at substantially right angles to the recess walls, a tubular socket member formed to snugly receive said plug member, a plurality of radially disposed plungers mounted on said socket member for radial movement into and out of the recesses formed in said plug member, and resilient means to yieldably resist radial movement of said plungers from said recesses, the outer end of said plug member having an outwardly converging frustro-conical surface to engage the inner ends of said plungers and to move the latter radially outwardly during insertion of the plug member into said socket member, said socket member being formed with a flange adapted to be connected to a brush back, said plug member being formed with a flange adapted to be connected to the operating shaft of a floor treating machine, said socket member being disposed in abutting engagement against said plug member flange.

GRANT W. BREUER.
MENKE DREWES, Jr.
EUGENE LAMBEAU.

REFERENCES CITED

The following references are of record in the file of this patent:

UNITED STATES PATENTS

| Number | Name | Date |
|---|---|---|
| 661,558 | Shuff | Nov. 13, 1900 |
| 789,222 | Lovekin | May 9, 1905 |
| 1,119,392 | Bernett | Dec. 1, 1914 |
| 1,814,655 | Andreasson | July 14, 1931 |
| 1,844,446 | Spohr et al. | Feb. 9, 1932 |

FOREIGN PATENTS

| Number | Country | Date |
|---|---|---|
| 19,503 | Great Britain | Sept. 1, 1911 |